US012216977B1

(12) United States Patent
Chow et al.

(10) Patent No.: US 12,216,977 B1
(45) Date of Patent: Feb. 4, 2025

(54) MAXIMUM TURN CONSTRAINT FOR ROUTING OF INTEGRATED CIRCUIT DESIGNS

(71) Applicant: Cadence Design Systems, Inc., San Jose, CA (US)

(72) Inventors: Wing-Kai Chow, Austin, TX (US); Hongxin Kong, College Station, TX (US); Mehmet Can Yildiz, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 418 days.

(21) Appl. No.: 17/831,287

(22) Filed: Jun. 2, 2022

(51) Int. Cl.
*G06F 30/392* (2020.01)
*G06F 30/3947* (2020.01)
*G06F 111/04* (2020.01)

(52) U.S. Cl.
CPC ........ *G06F 30/392* (2020.01); *G06F 30/3947* (2020.01); *G06F 2111/04* (2020.01)

(58) Field of Classification Search
CPC ............................ G06F 30/392; G06F 2111/04
USPC ........................................................ 716/122
See application file for complete search history.

(56) References Cited

U.S. PATENT DOCUMENTS

| 5,818,730 A * | 10/1998 | Young ............... H03K 19/17736 716/128 |
| 5,856,927 A * | 1/1999 | Greidinger .......... H01L 27/0207 257/210 |
| 10,706,202 B1 * | 7/2020 | Meyer ................. G06F 30/3947 |
| 2010/0295138 A1 * | 11/2010 | Montanya Silvestre .................... H01L 28/40 257/415 |
| 2024/0111936 A1 * | 4/2024 | Hsieh ................... H05K 3/0005 |

* cited by examiner

*Primary Examiner* — Jack Chiang
*Assistant Examiner* — Suchin Parihar
(74) *Attorney, Agent, or Firm* — Schwegman Lundberg & Woessner, P.A.

(57) ABSTRACT

Aspects of the present disclosure address systems and methods for routing an integrated circuit design based on a maximum turn constraint. Data describing an integrated circuit is accessed. The integrated circuit design comprises a net specifying a connection between a first pin and a second pin. A maximum turn constraint is accessed. The maximum turn constraint specifies a maximum number of turns for connection paths generated in routing the integrated circuit design. The net is routed based on the maximum turn constraint. The routing of the net results in a routed net comprising a connection path between the first pin and the second pin that includes a number of turns that satisfy the maximum turn constraint. A layout instance for the integrated circuit design is generated based in part on the routed net.

20 Claims, 23 Drawing Sheets

|   | 0 | 1 | 2 | 3 | 4 | 5 | 6 | 7 | 8 |
|---|---|---|---|---|---|---|---|---|---|
| 8 | 7 | 6 | 5 | 6 | 7 | 8 | 18 | 28 | 29 |
| 7 | 6 | 5 | 4 | 5 | 6 | 7 | 17 | 27 | 28 |
| 6 | 23 | 18 | 3 | 4 | 5 | 6 | 16 | 26 | 27 |
| 5 | 22 | 12 | 2 | 12 | 22 | 23 | 33 | 25 | 26 |
| 4 | 21 | 11 | 1 | 11 | 21 | 22 | 32 | 24 | 25 |
| 3 | 20 | 10 | 0 | 10 | 20 | 21 | 22 | 23 | 24 |
| 2 | 21 | 20 | 10 | 20 | 21 | 22 | 23 | 24 | 25 |
| 1 | 22 | 21 | 20 | 21 | 22 | 23 | 24 | 25 | 26 |
| 0 | 23 | 22 | 21 | 22 | 23 | 24 | 25 | 26 | 27 |

| | 8 | 7 | 6 | 5 | 4 | 3 | 2 | 1 | 0 |
|---|---|---|---|---|---|---|---|---|---|
| 8 | 13 | 12 | 11 | 10 | 9 | 8 | 7 | 6 | 7 |
| 7 | 22 | 21 | 20 | 10 | 11 | 12 | 13 | 5 | 6 |
| 6 | 21 | 20 | 10 | 0 | 1 | 2 | 3 | 4 | 5 |
| 5 | 22 | 21 | 20 | 10 | 11 | 12 | 4 | 5 | 6 |
| 4 | 11 | 10 | 9 | 8 | 7 | 6 | 5 | 6 | 7 |
| 3 | 12 | 11 | 10 | 9 | 8 | 7 | 6 | 7 | 8 |
| 2 | 25 | 24 | 23 | 22 | 32 | 33 | 16 | 17 | 18 |
| 1 | 26 | 25 | 24 | 23 | 24 | 25 | 26 | 27 | 28 |
| 0 | 27 | 26 | 25 | 24 | 25 | 26 | 27 | 28 | 29 |

FIG. 8I

|   | x=8 | x=7 | x=6 | x=5 | x=4 | x=3 | x=2 | x=1 | x=0 |
|---|---|---|---|---|---|---|---|---|---|
| y=8 | 13 | 22 | 21 | 22 | 11 | 12 | 25 | 26 | 27 |
| y=7 | 12 | 21 | 20 | 21 | 10 | 11 | 24 | 25 | 26 |
| y=6 | 11 | 20 | 10 | 20 | 9  | 10 | 23 | 24 | 25 |
| y=5 | 10 | 10 | 0  | 10 | 8  | 9  | 22 | 23 | 24 |
| y=4 | 9  | 11 | 1  | 11 | 7  | 8  | 32 | 24 | 25 |
| y=3 | 8  | 12 | 2  | 12 | 6  | 7  | 33 | 25 | 26 |
| y=2 | 7  | 13 | 3  | 4  | 5  | 6  | 16 | 26 | 27 |
| y=1 | 6  | 5  | 4  | 5  | 6  | 7  | 17 | 27 | 28 |
| y=0 | 7  | 6  | 5  | 6  | 7  | 8  | 18 | 28 | 29 |

| y\x | 0 | 1 | 2 | 3 | 4 | 5 | 6 | 7 | 8 |
|---|---|---|---|---|---|---|---|---|---|
| 8 | 13 | 22 | 21 | 22 | 11 | 12 | 25 | 26 | 27 |
| 7 | 12 | 21 | 20 | 21 | 10 | 11 | 24 | 25 | 26 |
| 6 | 11 | 20 | 10 | 20 | 9 | 10 | 23 | 24 | 25 |
| 5 | 10 | 10 | 0 | 10 | 8 | 9 | 22 | 23 | 24 |
| 4 | 9 | 11 | 1 | 11 | 7 | 8 | 32 | 24 | 25 |
| 3 | 8 | 12 | 2 | 12 | 6 | 7 | 33 | 25 | 26 |
| 2 | 7 | 13 | 3 | 4 | 5 | 6 | 16 | 26 | 27 |
| 1 | 6 | 5 | 4 | 5 | 6 | 7 | 17 | 27 | 28 |
| 0 | 7 | 6 | 5 | 6 | 7 | 8 | 18 | 28 | 29 |

| y \ x | 8 | 7 | 6 | 5 | 4 | 3 | 2 | 1 | 0 |
|---|---|---|---|---|---|---|---|---|---|
| 8 | 13 | 15 | 13 | 12 | 11 | 12 | 13 | 15 | 16 |
| 7 | 12 | 14 | 12 | 11 | 10 | 11 | 12 | 14 | 15 |
| 6 | 11 | 20 | 10 | 20 | 9 | 10 | 11 | 12 | 13 |
| 5 | 10 | 10 | 0 | 10 | 8 | 9 | 10 | 11 | 12 |
| 4 | 9 | 11 | 1 | 11 | 7 | 8 | 32 | 24 | 25 |
| 3 | 8 | 12 | 2 | 12 | 6 | 7 | 33 | 25 | 26 |
| 2 | 7 | 13 | 3 | 4 | 5 | 6 | 16 | 26 | 27 |
| 1 | 6 | 5 | 4 | 5 | 6 | 7 | 17 | 27 | 28 |
| 0 | 7 | 6 | 5 | 6 | 7 | 8 | 18 | 28 | 29 |

FIG. 8M

MAXIMUM TURN CONSTRAINT FOR ROUTING OF INTEGRATED CIRCUIT DESIGNS

TECHNICAL FIELD

The present disclosure generally relates to the technical field of integrated circuit (IC) design. In particular, the present disclosure addresses systems and methods for routing an IC design based on a maximum turn constraint.

BACKGROUND

An IC comprises cells of similar and/or various sizes and connections between or among the cells. A cell includes several pins interconnected by wires to pins of one or more other cells. A design netlist describes the logical connectivity between cells in an IC design. A netlist can include a set of nets and each net includes two or more interconnected pins in the IC design.

Design engineers design ICs by transforming circuit descriptions of the ICs into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on ICs. For instance, EDA tools commonly use rectilinear lines to represent the wire segments that interconnect the IC components. These tools also represent electronic and circuit IC components as geometric objects with varying shapes and sizes.

BRIEF DESCRIPTION OF THE DRAWINGS

Various ones of the appended drawings merely illustrate example embodiments of the present inventive subject matter and cannot be considered as limiting its scope.

FIGS. 8A-8M are conceptual diagrams illustrating a process routing an IC design based on a maximum turn constraint, according to some example embodiments.

DETAILED DESCRIPTION

Figure 1:
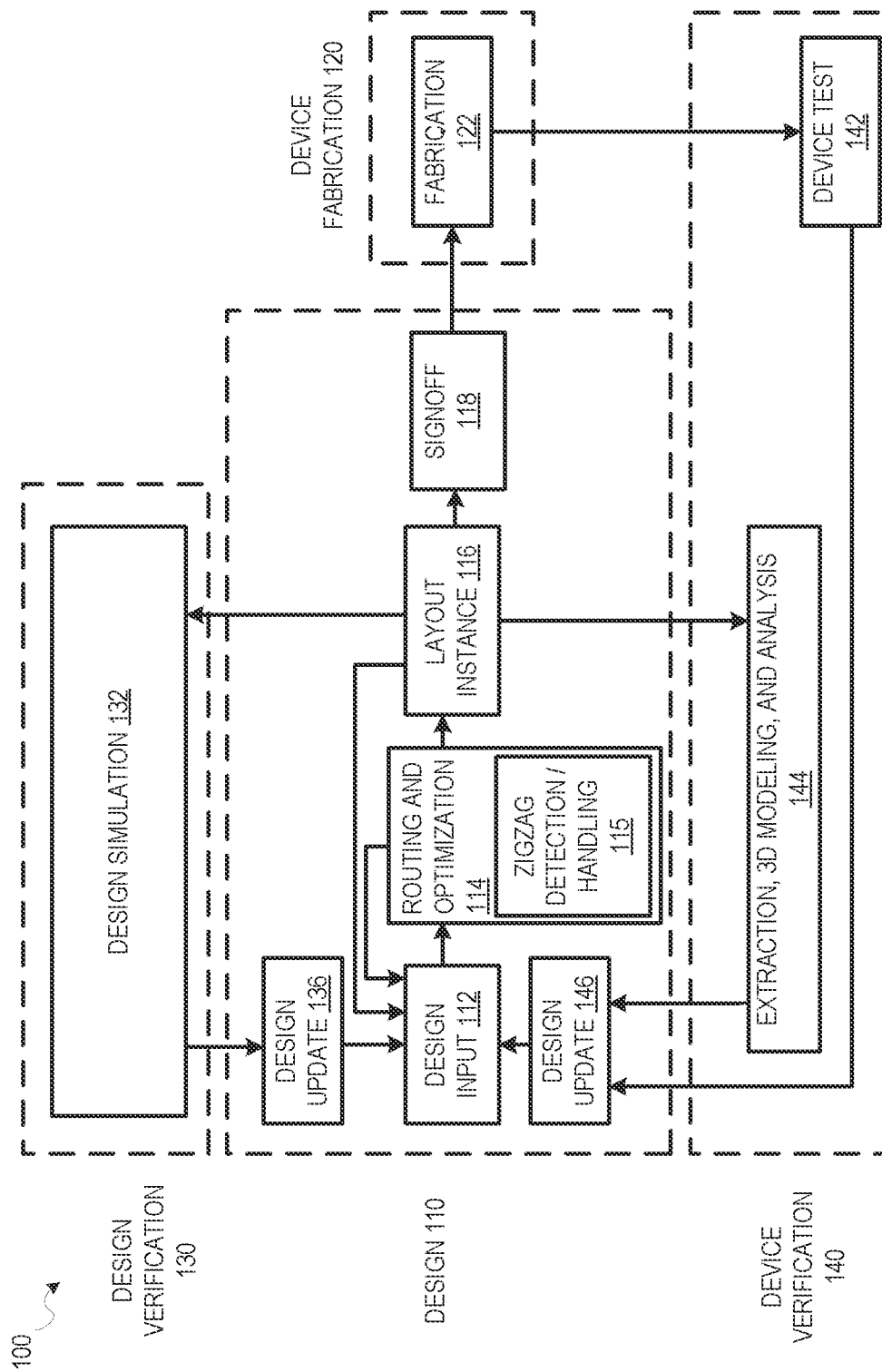
FIG. 1 is a diagram illustrating an example IC design process flow that includes routing based on a maximum turn constraint, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The IC design process generally entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnections between or among the circuit components by determining precise connection paths for each net; and (5) verification, which checks the layout to ensure that it meets design and functional requirements.

Routing is a key operation in the physical IC design cycle. Generally, routing includes determining a connection path between two or more pins in an IC design. The connection path includes only horizontal and vertical lines. In determining a connection path between two or more pins, routing blockages and congestion are avoided using turns. As used herein, a "turn" in a connection path corresponds to a transition from a vertical line to a horizontal line or vice versa. In most implementations, wires are fabricated in multiple unidirectional routing layers and wires on different layers are connected with vias located between two routing layers. Hence, a turn that is included in a connection path results in a via being used in the physical implementation to connect wires between routing layers. However, a via has higher resistance and therefore a connection path with a high number of turns would cause delay for the electronic signal carried by the connection path.

Aspects of the present disclosure address problems with conventional approaches to routing that result in connection paths with a high number of turns by routing in accordance with an adjustable maximum turn constraint. The maximum turn constraint defines a maximum number of turns in connection paths generated during routing. The maximum number of turns can be specified and adjusted by a user. In this manner, this approach to routing improves upon conventional approaches by providing a mechanism to control the maximum number of turns for a routing solution, which is not provided by conventional approaches.

Consistent with some embodiments, a method corresponding to this improved routing approach includes accessing data describing an IC design comprising a net specifying a connection between a first pin and a second pin. The method further includes accessing a maximum turn constraint associated with the IC design and routing the net based on the maximum turn constraint. The routing of the net results in a routed net comprising a connection path between the first pin and the second pin where the number of turns in the connection path satisfies the maximum turn constraint. That is, the number of turns in the connection path does not exceed the maximum number of turns specified by the maximum turn constraint.

For some embodiments, routing of a net is modeled by a path finding problem in a grid graph, and multiple iterations of path finding are performed to identify an optimal path based on available routing resources and the maximum turn constraint. The number of iterations is based on the maximum number of turns specified by the maximum turn constraint. In performing the multiple iterations, one or more paths may be identified. For a given path, a routing score is determined based on fixed edge scores associated with edges in the grid graph that are traversed by each path. Each edge score represents availability of routing resources. Ultimately, the optimal path is determined based on routing scores determined for the one or more paths that are identified.

FIG. 1 is a diagram illustrating an example design process flow 100 that includes routing based on a maximum turn constraint, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. While the design process flow 100 shows the routing and optimization 114 operation occurring prior to a layout instance 116, routing, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

The routing and optimization operation 114 includes accessing a maximum turn constraint that limits a number of turns in routing solutions for the IC design. That is, the maximum turn constraint specifies a maximum number of turns in connection paths between pins to be generated as part of routing the design. Accordingly, the number of turns in the connection paths of routed nets generated by routing the design do not exceed the maximum number of turns specified by the maximum turn constraint. For some embodiments, the maximum turn constraint can be received from a user via a user interface provided by the computing device. Accordingly, for these embodiments, a mechanism is provided to users to limit the number of turns in routing solutions generated as part of the routing and optimization operation 114.

After design inputs are used in the design input operation 112 to generate a circuit layout, and any of the routing and optimization operations 114 are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

A design update 136 from the design simulation 132 operations; a design update 146 from the device test 142 operations or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

In the discussion that follows, the methods 200, 500, 600, and 700 are described. For some embodiments, any one or more of the methods 200, 500, 600, and 700 are performed as part of a routing process applied to a circuit design (e.g., by an EDA software system). It will be understood that any one or more of the methods 200, 500, 600, and 700 may be performed by a device, such as a computing device executing instructions of an EDA software system. For instance, the operations of any one or more of the methods 200, 500, 600, and 700 may be represented by executable instructions (e.g., EDA software) that, when executed by a processor of a computing device, cause the computing device to perform the method. Thus, an operation of any one or more of the methods 200, 500, 600, and 700 may be performed by a hardware processor (e.g., central processing unit or graphics processing unit) of a computing device (e.g., desktop, server, etc.). Accordingly, the methods 200, 500, 600, and 700 are described below with reference to such a computing device.

Depending on the embodiment, an operation of any one or more of the methods 200, 500, 600, and 700 may be repeated in different ways or involve intervening operations not shown. Though the operations of the methods 200, 500, 600, and 700 may be depicted and described in a certain order, the order in which the operations are performed may vary among embodiments, including performing certain operations in parallel.

Figure 2:
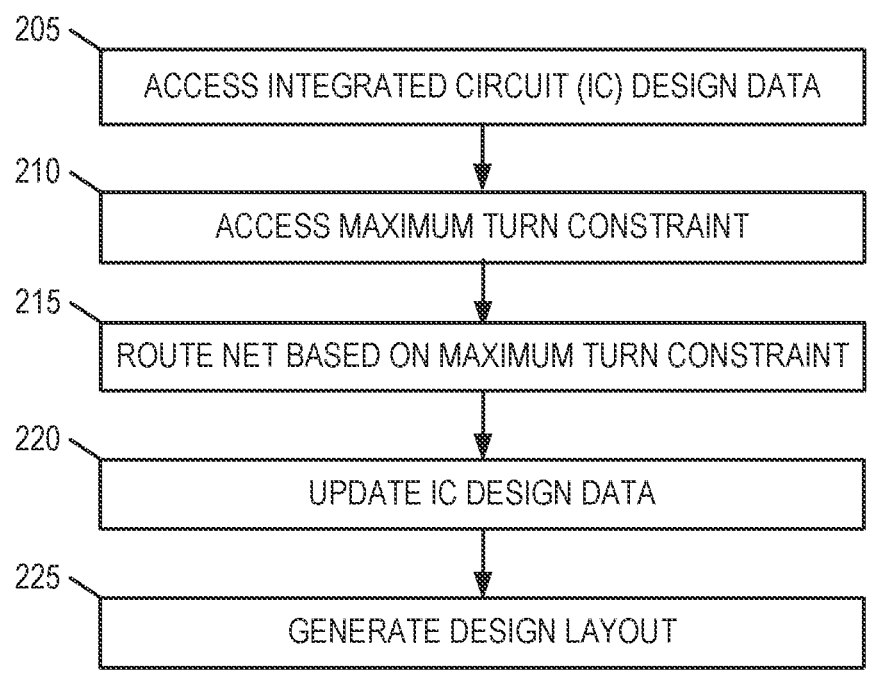
FIGS. 2-4 are flowcharts illustrating operations of a method for routing an IC design based on a maximum turn constraint, according to some example embodiments.
Figure 3:
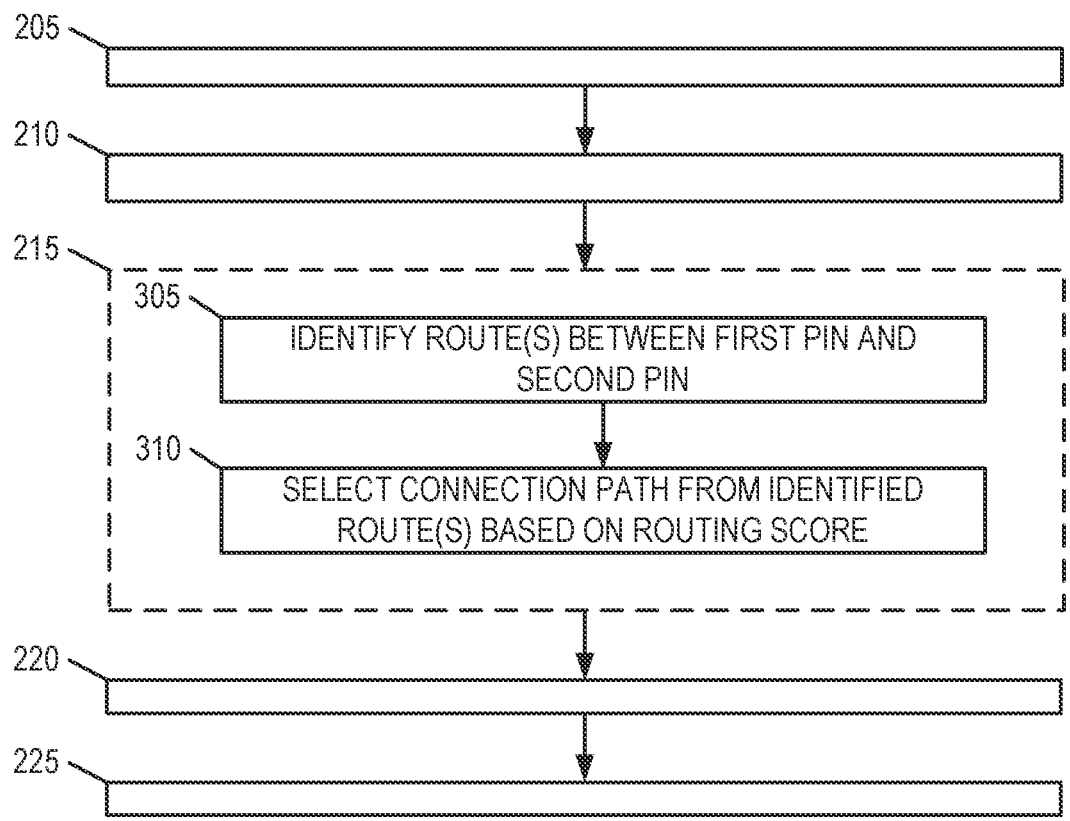
Figure 4:
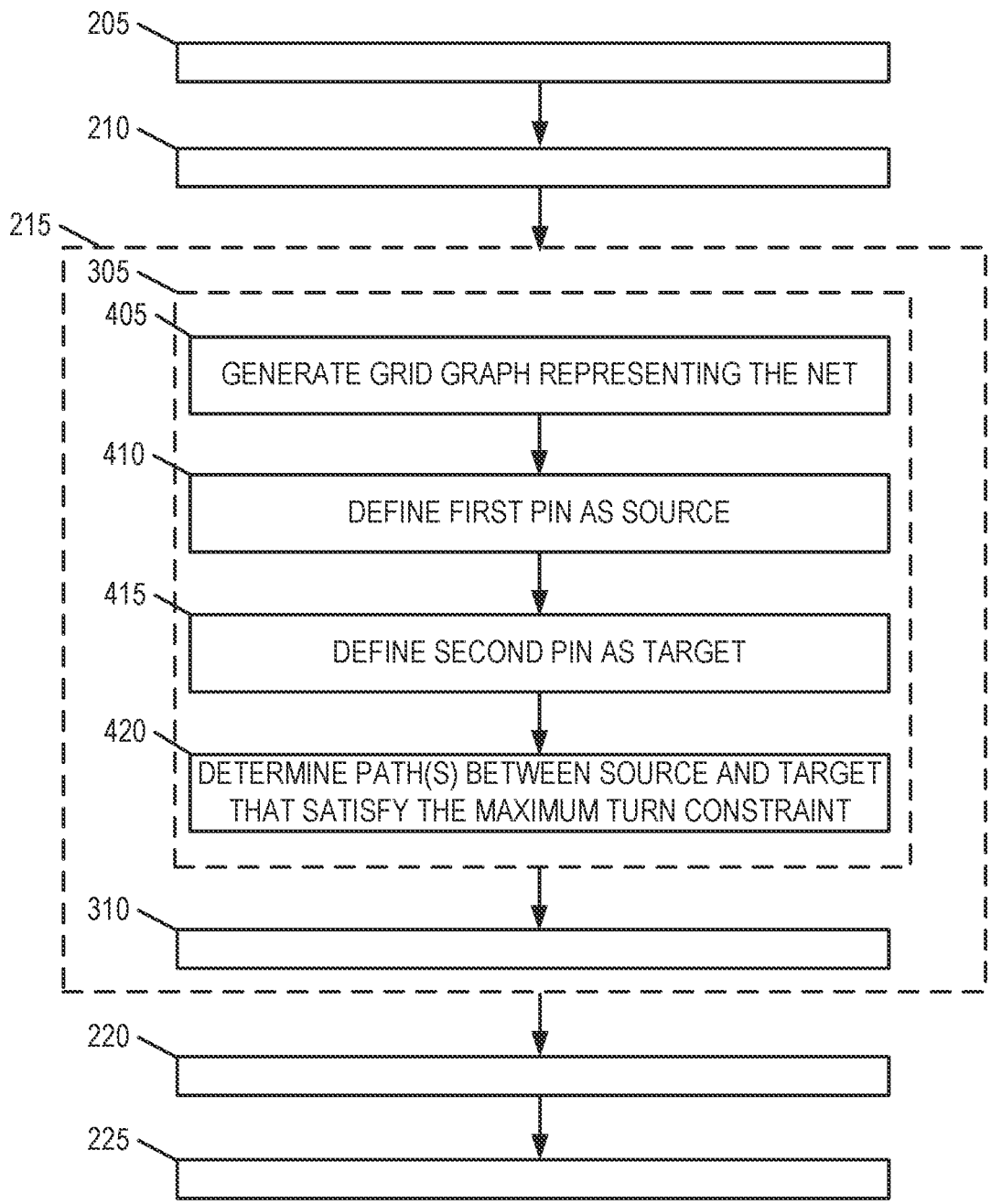

FIGS. 2-4 are flowcharts illustrating operations of a method 200 for routing an IC design based on a maximum turn constraint, according to some example embodiments. The method 200 as illustrated begins at operation 205 where the computing device accesses data describing an IC design (also referred to herein as "IC design data") from memory. The IC design data can comprise or correspond to one or more IC design files stored in memory. The IC design data includes a net specific to a connection between two pins-a first pin and a second pin. The net may be included among a set of nets specified by a netlist in the IC design.

At operation 210, the computing device accesses a maximum turn constraint that limits a number of turns in connection paths generated in routing the IC design. That is, the maximum turn constraint specifies a maximum number of turns for connection paths to be generated by routing the IC design including the net. For some embodiments, the maximum turn constraint can be received from a user via a user interface provided by the computing device. For some embodiments, the maximum turn constraint can be a default value. The computing device can access the maximum turn constraint from the IC design data or another location in memory.

The computing device routes the net based on the maximum turn constraint, at operation 215. The routing of the net based on the maximum turn constraint results in a routed net comprising a connection path between the first pin and the second pin that satisfies the maximum turn constraint. That is, the connection path includes a number of turns that does not exceed the maximum number of turns specified by the maximum turn constraint. Further details regarding the routing of the net are discussed below.

At operation 220, the computing device updates the IC design data based on the routing of the net. In updating the IC design data, the computing device updates the IC design data with data describing the routed net. The computing device, at operation 225, generates a design layout instance for the IC device design based in part on the routed net. The layout describes the physical layout dimensions of the IC device.

As shown in FIG. 3, the method 200 may, in some embodiments, further include operations 305 and 310. For some embodiments, the operations 305 and 310 are performed as part of operation 215 where the computing device routes the net based on the maximum turn constraint.

At operation 305, the computing device identifies one or more routes between the first pin and the second pin that satisfy the maximum turn constraint. That is, the computing device identifies one or more routes between the first pin and the second pin that have a number of turns that do not exceed the maximum number of turns. As part of identifying the one or more routes, the computing device determines a routing score for each of the one or more routes. The routing score of a route provides a measure of routing resources utilized by the route. The computing device selects, at operation 310, the connection path between the first pin and the second pin based on the routing score for each of the one or more routes.

As shown in FIG. 4, the method 200 may, in some embodiments, further include operations 405, 410, 415, and 420. For some embodiments, the operations 405, 410, 415, and 420 are performed as part of operation 305 where the computing device identifies one or more routes between the first pin and the second pin. At operation 405, the computing device generates a grid graph representing the net. The grid graph comprises grid cells organized into rows and columns and edges between adjacent grid cells. Each edge of the grid graph is associated with an edge score that represents an availability of routing resources. A routing score, as referenced above, for a given route can be determined by the computing device based on an aggregate of edge scores corresponding to edges traversed by the route.

Within the grid graph, the computing device defines the first pin as a source (at operation 410) and defines the second pin as a target (at operation 415). At operation 420, the computing device uses a path finding algorithm (e.g., Dijkstra's algorithm) to determine one or more paths between the source and the target that satisfy the maximum turn constraint. The one or more paths correspond to the one or more routes referenced above.

As shown, in determining the one or more paths using the path finding algorithm, the computing device performs multiple iterations of path finding between the source and the target to identify the one or more paths. For some embodiments, the number of iterations performed by the computing device can be based on the maximum number of turns. For example, at each Nth iteration, a path with N−1 turns can be identified. Accordingly, assuming the maximum turn constraint specifies a maximum of N turns, the computing device performs N+1 iterations of path finding, for these embodiments.

At each iteration, the computing device performs score propagation in a horizontal direction before performing score propagation in a vertical direction. In performing score propagation in the horizontal direction, the computing device updates one or more scores associated with one or more grid cells in one or more rows of the grid graph (also referred to herein as "cell score"). For example, in performing score propagation within the grid graph in the horizontal direction, the computing device determines a first edge score associated with a first edge between a first grid cell and a second grid cell that is adjacent to the first grid cell in a row of the grid graph. The computing device determines a first cell score associated with the first cell, which may be a cell score set in a previous iteration. The computing device sets a second cell score associated with the second grid cell based on a sum of the first edge score and the first cell score. The computing device may set the second cell score associated with the second grid cell based on determining the sum of the first edge score and the first cell score is less than a current score associated with the second grid cell (e.g., a score determined in a previous iteration).

In performing score propagation in the vertical direction, the computing device updates one or more scores associated with one or more grid cells in one or more columns of the grid graph. For example, in performing score propagation within the grid graph in the vertical direction, the computing device determines a first edge score associated with a first edge between a first grid cell and a second grid cell that is adjacent to the first grid cell in a column of the grid graph. The computing device determines a first cell score associated with the first cell, which may be a cell score set in a previous iteration. The computing device sets a second cell score associated with the second grid cell based on a sum of the first edge score and the first cell score. The computing device may set the second cell score associated with the second grid cell based on determining the sum of the first edge score and the first cell score is less than a current score associated with the second grid cell (e.g., a score determined in a previous iteration). The computing device determines whether the second cell score was updated during score propagation in the horizontal direction, and sets the second cell score in response to determining the second cell score was not updated during score propagation in the horizontal direction.

For some embodiments, fewer than N+1 iterations of path finding may be performed based on whether a given iteration results in an update to cell scores. For example, if a given iteration does not result in an update to any cell scores in the grid graph, the process may terminate without performing further iterations regardless of the value of N and the number of previous iterations performed. Further details regarding score propagation within the context of finding paths between the source and target within the grid graph are discussed below.

Figure 5A:
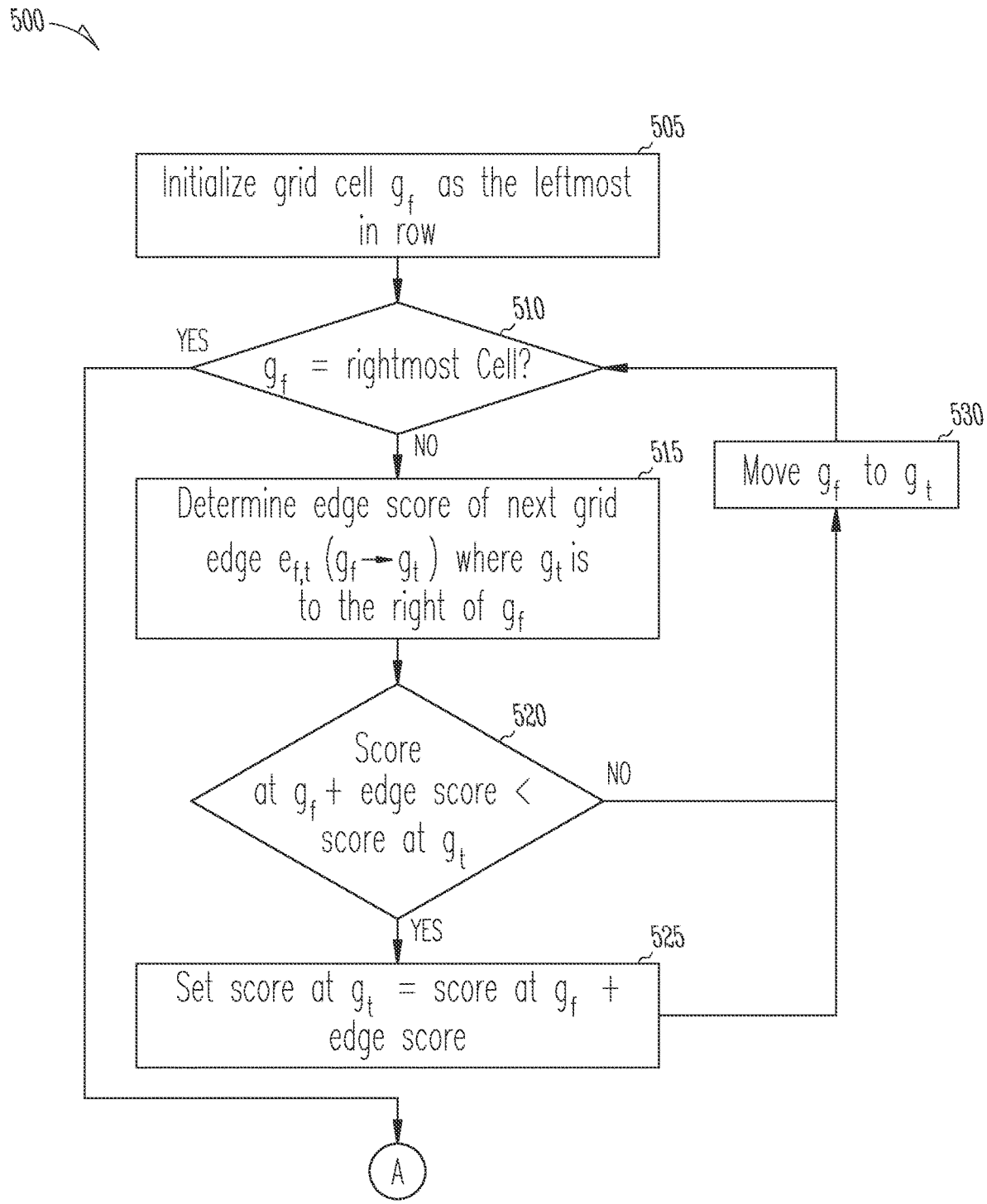
FIGS. 5A-5B are flowcharts illustrating operations of a method for performing score propagation in a horizontal direction, according to some example embodiments.
Figure 5B:
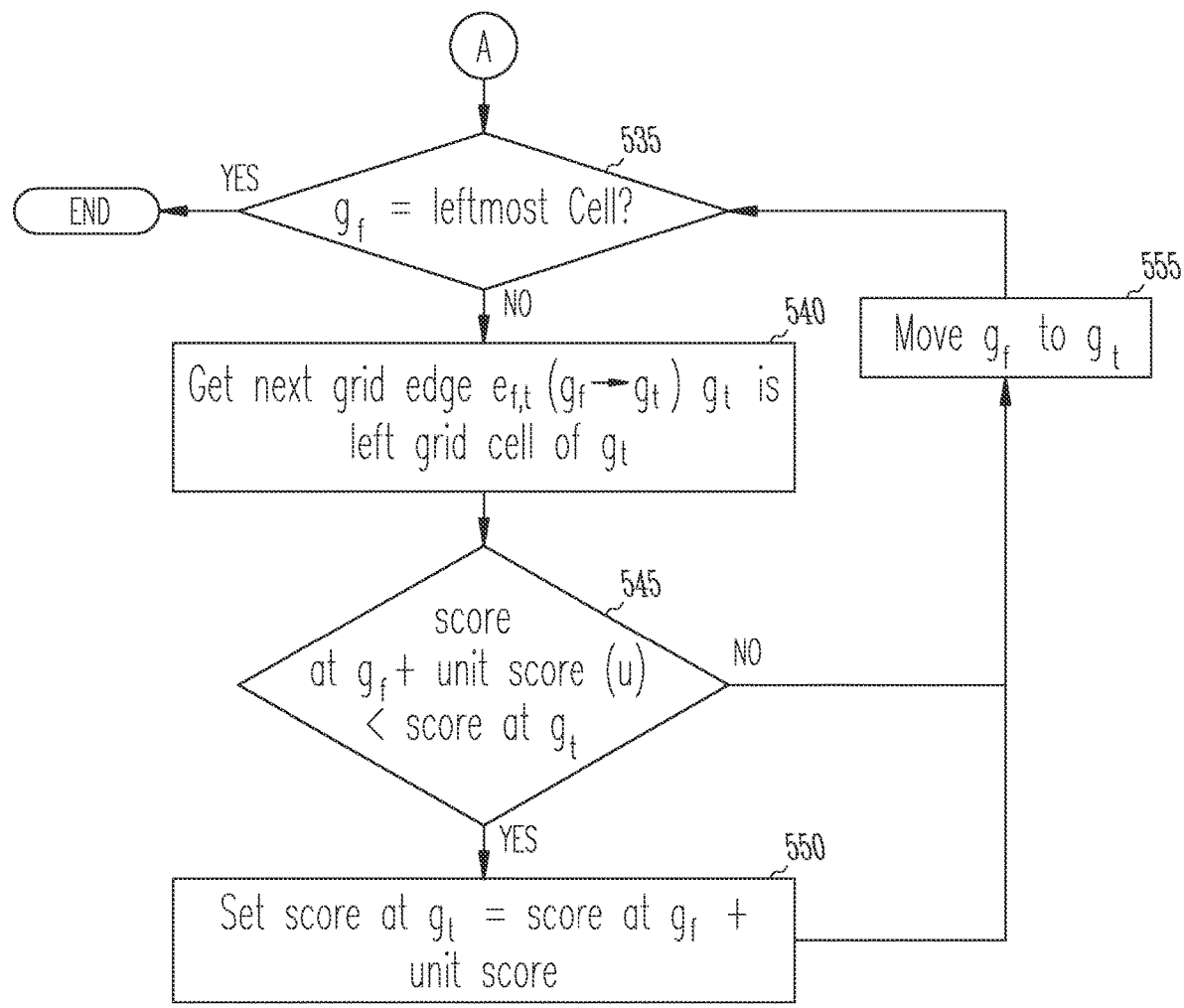

FIGS. 5A-5B are flowcharts illustrating operations of a method 500 for performing score propagation in a grid graph representation of a net in a horizontal direction, according to some example embodiments. As noted above, within the grid graph, a first pin is defined as a source and a second pin is defined as a target. For some embodiments, the method 500 is performed as part of (e.g., as a sub-process or sub-routine) the operation 215 where the computing device routes the net based on the maximum turn constraint. For example, the method 500 may be performed as part of a single iteration of a multiple iteration path finding process performed at operation 420. As noted above, score propagation in the grid graph in the horizontal direction includes updating one or more grid cells in one or more rows of the grid graph. Accordingly, though the description of method 500 that follows addresses only a single row, it shall be appreciated that at each iteration of the path finding process, the method 500 can be repeated to update scores in one or more grid cells of one or more additional rows in the grid graph. Within the context of the method 500, at the first iteration, a cell score associated with the source is initialized at 0 while the scores for remaining grid cells in the grid graph are initialized at infinity.

The method 500 begins at operation 505, where the computing device initializes a grid cell $g_f$ as the leftmost grid cell in a row of the grid graph. At operation 510, the computing device checks whether the grid cell $g_f$ is the rightmost cell in the row. If, at operation 510, the computing device determines that the grid cell $g_f$ is not the rightmost grid cell in the row, the method moves to operation 515 where the computing device identifies an edge score associated with a grid edge $e_{f,t}$ ($g_f \rightarrow g_t$) that is between the grid cell $g_f$ and a grid cell $g_t$ that is to the right of grid cell $g_f$. At operation 520, the computing device compares a sum of the current score at grid cell $g_f$ and the edge score associated with the grid edge $e_{f,t}$ ($g_f \rightarrow g_t$) with the current score at grid cell $g_t$.

If the sum of the current score at grid cell $g_f$ and the edge score associated with the grid edge $e_{f,t}$ ($g_f \rightarrow g_t$) is less than the current score at grid cell $g_t$, the computing device, at operation 525, sets the score at grid cell $g_t$ as the sum of the current score at grid cell $g_f$ and the edge score associated with the grid edge $e_{f,t}$ ($g_f \rightarrow g_t$), and the computing device stores the score for the grid cell $g_t$ along with the direction of $g_t$ relative to $g_f$. Otherwise, the method moves to operation 530, where the computing device sets grid cell $g_f$ to grid cell $g_t$ and the method returns to operation 510.

If, at operation 510, the computing device determines that grid cell $g_f$ is the rightmost cell in the row, the method proceeds to operation 535, where the computing device checks whether grid cell $g_f$ is the leftmost grid cell in the row. If, at operation 535, the computing device determines that the grid cell $g_f$ is not the leftmost grid cell in the row, the method moves to operation 540, where the computing device identifies an edge score associated with a grid edge $e_{f,t}$ ($g_f \rightarrow g_t$) that is between the grid cell $g_f$ and a grid cell $g_t$ that is to the left of grid cell $g_f$. At operation 545, the computing device compares a sum of the current score at grid cell $g_f$ and the edge score associated with the grid edge $e_{f,t}$ ($g_f \rightarrow g_t$) with the current score at grid cell $g_t$.

If the sum of the current score at grid cell $g_f$ and the edge score associated with the grid edge $e_{f,t}$ ($g_f \rightarrow g_t$) is less than the current score at grid cell $g_t$, the computing device, at operation 550, sets the score at grid cell $g_t$ as the sum of the current score at grid cell $g_f$ and the edge score associated with the grid edge $e_{f,t}$ ($g_f \rightarrow g_t$). The computing device stores the score for the grid cell $g_t$ along with the direction of $g_t$ relative to $g_f$. Otherwise, the method moves to operation 555, where the computing device sets grid cell $g_f$ to grid cell $g_t$ and the method returns to operation 535. If, at operation 535, the computing device determines that grid cell $g_f$ is the leftmost cell in the row, the method 500 ends.

Figure 6A:
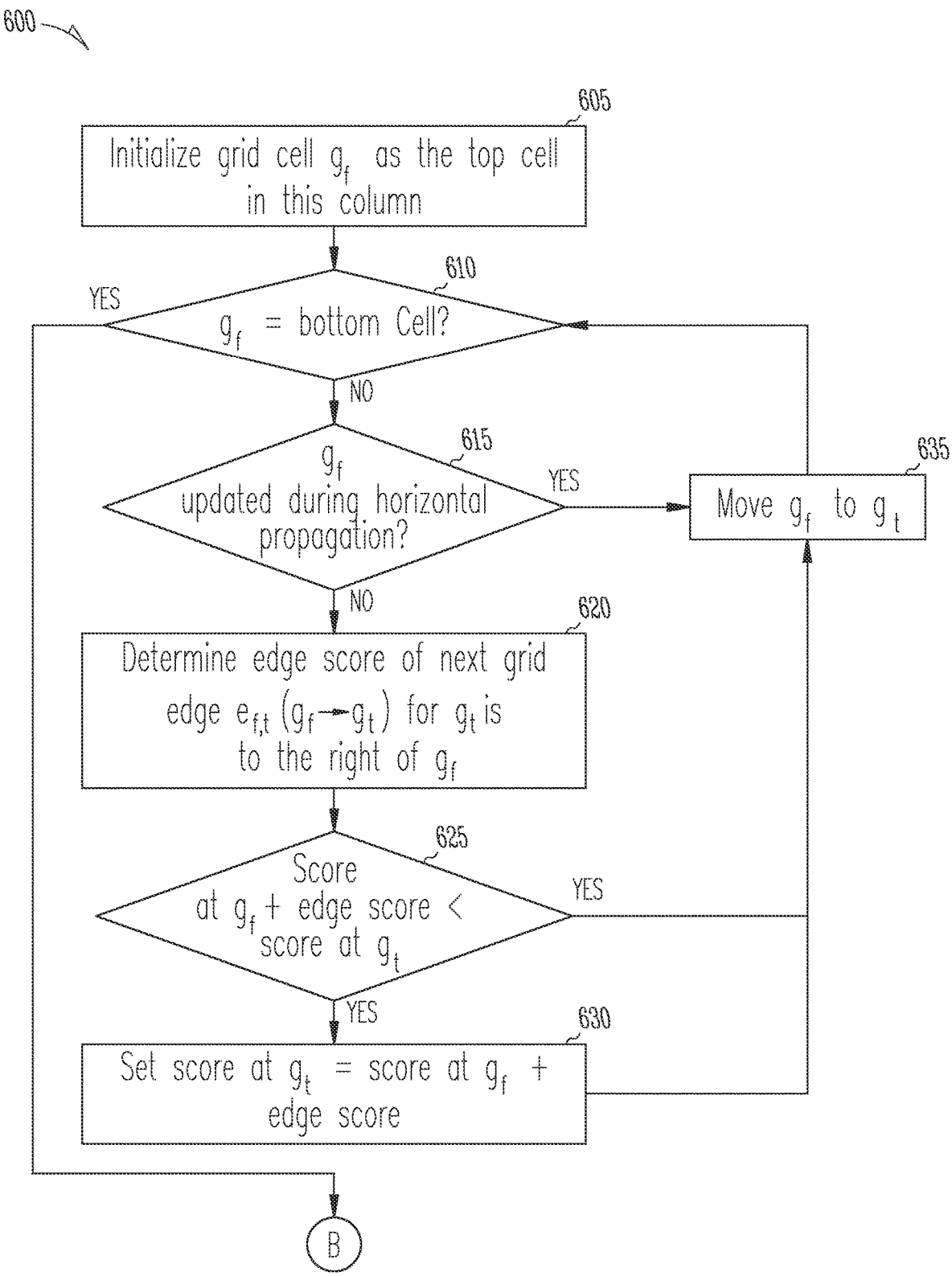
FIGS. 6A-6B are flowcharts illustrating operations of a method for performing score propagation in a vertical direction, according to some example embodiments.
Figure 6B:
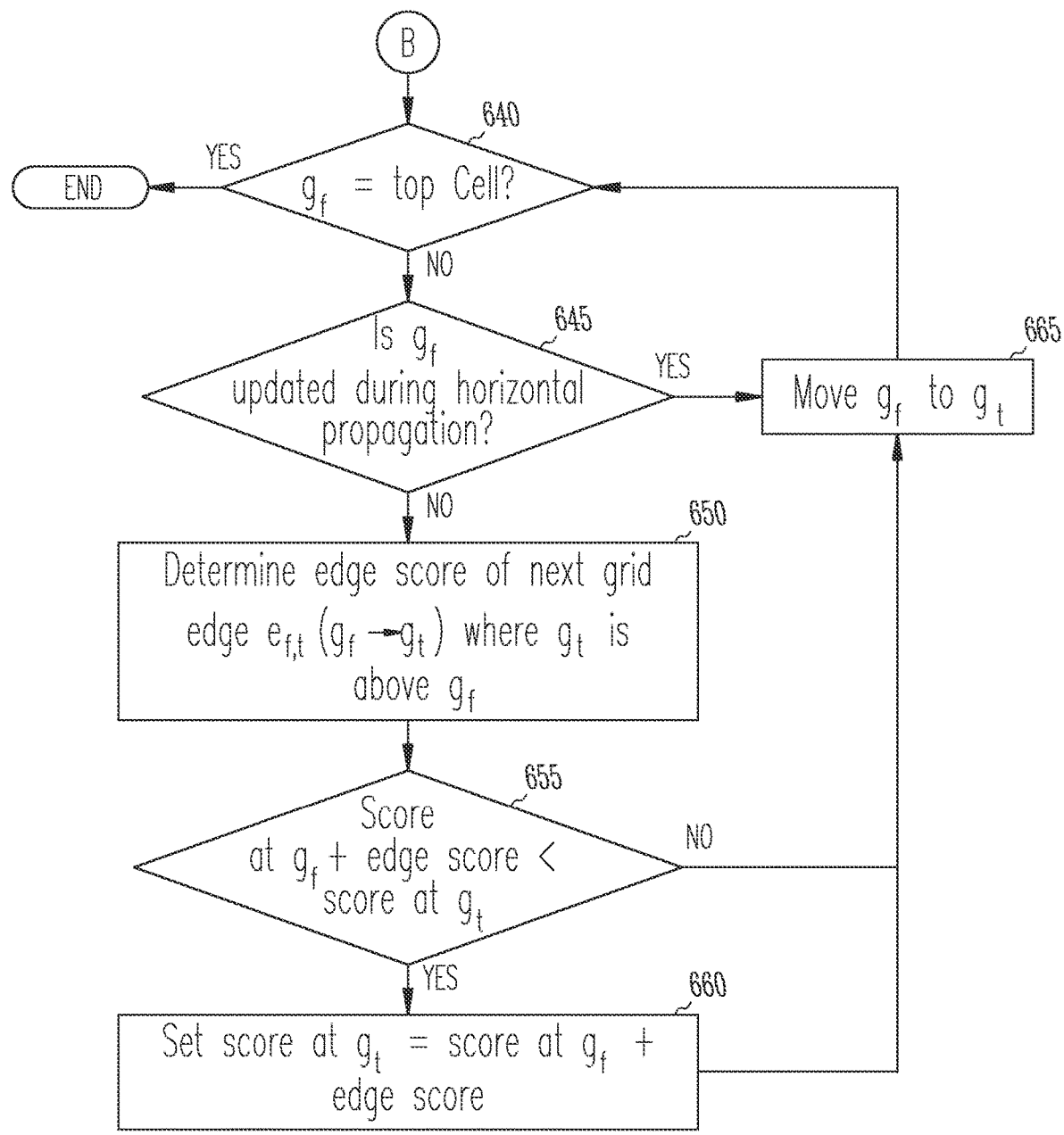

FIGS. 6A-6B are flowcharts illustrating operations of a method 600 for performing score propagation in a grid graph representation of a net in a vertical direction, according to some example embodiments. As noted above, within the grid graph, a first pin is defined as a source and a second pin is defined as a target. For some embodiments, the method 600 is performed as part of (e.g., as a sub-process or sub-routine) the operation 215 where the computing device routes the net based on the maximum turn constraint. For example, the method 600 may be performed as part of a single iteration of a multiple iteration path finding process performed at operation 420. As noted above, score propagation in the grid graph in the vertical direction includes updating one or more grid cells in one or more columns of the grid graph. Accordingly, though the description of method 600 that follows addresses only a single column, it shall be appreciated that at each iteration of the path finding process, the method 600 can be repeated to update scores in one or more grid cells of one or more additional columns in the grid graph. In the context of the method 600, scores for one or more grid cells may be previously determined in an iteration of the method 500.

The method 600 begins at operation 605, where the computing device initializes $g_f$ as the top grid cell in a column of the grid graph. At operation 610, the computing device checks whether $g_f$ is the bottom cell in the column.

During vertical propagation, only grid cell scores that were not updated during horizontal propagation are updated. Hence, if, at operation 610, the computing device determines that $g_f$ is not the top grid cell in the column, the method moves to operation 615, where the computing device checks whether the $g_f$ was updated during horizontal propagation (as part of the method 500). If $g_f$ was not updated during horizontal propagation, the method moves to operation 620.

At operation 620, the computing device identifies an edge score associated with a grid edge $e_{f,t}$($g_f \rightarrow g_t$) that is between grand a grid cell $g_t$ that is below gr. At operation 625, the computing device compares a sum of the current score at grand the edge score associated with the grid edge $e_{f,t}$ ($g_f \rightarrow g_t$) with the current score at grid cell $g_f$.

If the sum of the current score at grand the edge score associated with the grid edge $e_{f,t}$($g_f \rightarrow g_t$) is less than the current score at $g_t$, the computing device, at operation 630, sets the score at grid cell $g_t$ as the sum of the current score at grand the edge score associated with the grid edge em. ($g_f \rightarrow g_t$), and the computing device stores the score for $g_t$ along with the direction of $g_f$ relative to $g_t$.

If the grid cell $g_f$ was updated during horizontal propagation or if the sum of the current score at grid cell $g_f$ and the edge score associated with the grid edge $e_{f,t}$($g_f \rightarrow g_t$) is not less than the current score at grid cell $g_t$, the method moves to operation 635, where the computing device sets $g_f$ to grid cell $g_t$ and the method returns to operation 610.

If, at operation 610, the computing device determines that $g_f$ is the bottom cell in the column, the method proceeds to operation 640, where the computing device checks whether grid cell $g_f$ is the top cell in the column. If, at operation 640, the computing device determines that the $g_f$ is not the top cell in the column, the method moves to operation 645, where the computing device checks whether $g_f$ was updated during horizontal propagation (as part of the method 500). If $g_f$ was not updated during horizontal propagation, the method moves to operation 650, where the computing device identifies an edge score associated with a grid edge $e_{f,t}$($g_f \rightarrow g_t$) that is between grand a grid cell $g_t$ that is to the above $g_f$. At operation 655, the computing device compares a sum of the current score at $g_f$ and the edge score associated with the grid edge $e_{f,t}$($g_f \rightarrow g_t$) with the current score at grid cell $g_t$.

If the sum of the current score at $g_f$ and the edge score associated with the grid edge $e_{f,t}$($g_f \rightarrow g_t$) is less than the current score at $g_t$, the computing device, at operation 660, sets the score at $g_t$ as the sum of the current score at grand the edge score associated with the grid edge $e_{f,t}$($g_f \rightarrow g_t$) and the computing device stores the score for $g_f$ along with the direction of gr relative to $g_f$. Otherwise, the method moves to operation 665, where the computing device sets $g_f$ to $g_t$ and the method returns to operation 640. If, at operation 640, the computing device determines that $g_f$ is the top cell in the column, the method 600 ends.

Figure 7:
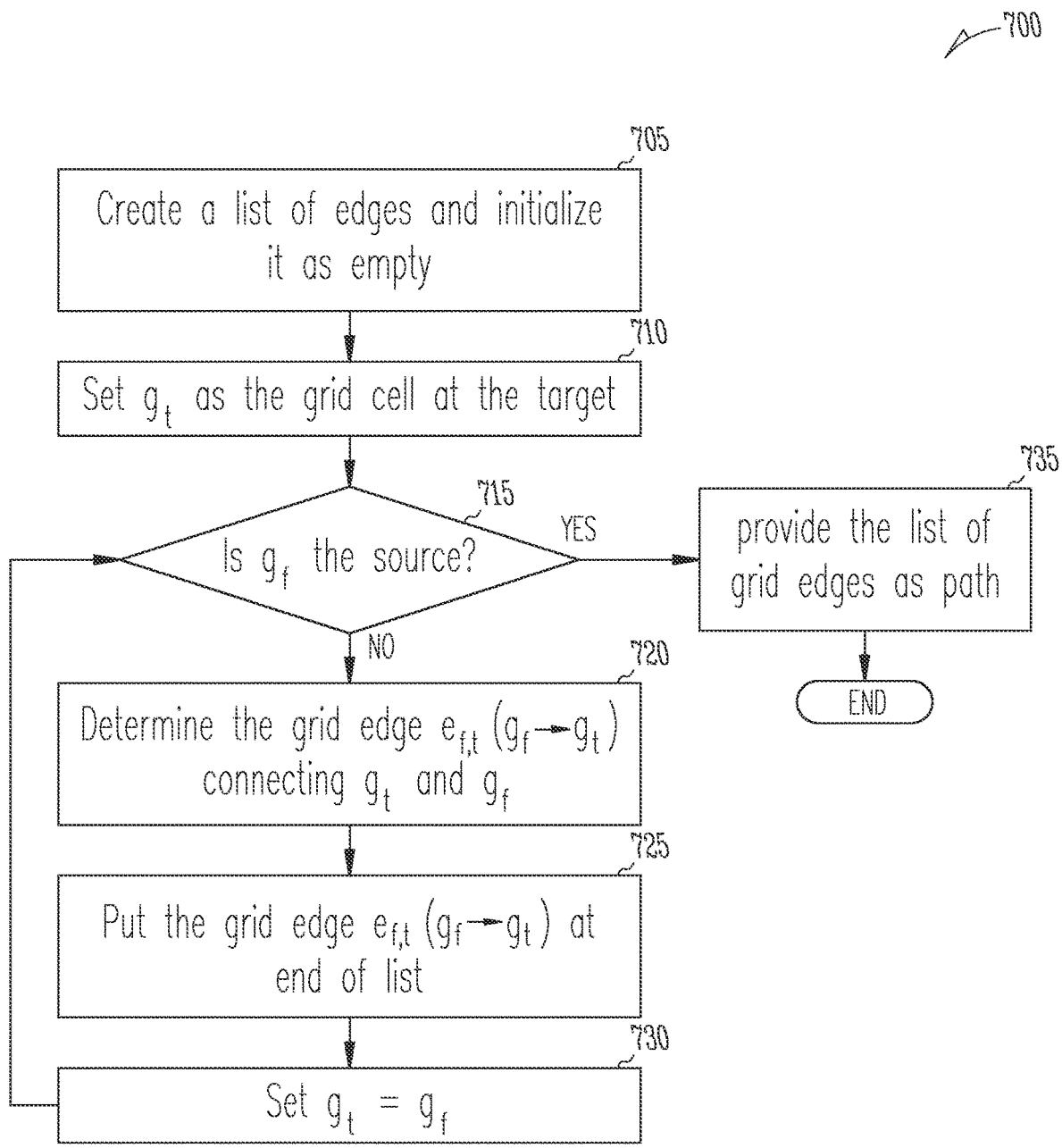
FIG. 7 is a flowchart illustrating operations of a method for identifying a connection path based on multiple iterations of path finding, according to some example embodiments.

FIG. 7 is a flowchart illustrating operations of a method 700 for identifying a connection path based on multiple iterations of path finding, according to some example embodiments. As noted above, within the grid graph, a first pin is defined as a source and a second pin is defined as a target. For some embodiments, the method 700 is performed as part of (e.g., as a sub-process or sub-routine) the operation 215 where the computing device routes the net based on the maximum turn constraint. For example, the method 700 can be performed as part of the operation 310 where the computing device selects the connection path between the first pin and the second pin based on the routing score for each of the one or more routes.

The method 700 begins at operation 705, where the computing device creates a list of edges. At initialization, the list of edges is empty. At operation 710, the computing device initializes $g_t$ as the grid cell of the target (second pin). At operation 715, the computing device checks whether $g_t$ is the source (first pin). If $g_t$ is not the source, the computing device identifies the edge $e_{f,t}(g_f \rightarrow g_t)$ between $g_t$ and a grid cell $g_f$ from which the grid cell's score is derived (operation 720). The computing device identifies the edge based on stored data that indicates the score of the grid cell $g_f$. At operation 725, the computing device adds the edge $e_{f,t}$ ($g_f \rightarrow g_t$) to the list of edges. The computing device, at operation 730, sets $g_t$ to $g_f$. If, at operation 715, the computing device determines $g_t$ is the source (first pin), the method moves to operation 735, where the computing device provides the list of edges defining a path between the source and the target, which may, for example, correspond to the connection path between the first pin and the second pin selected at operation 310.

FIGS. 8A-8M are conceptual diagrams illustrating a multiple iteration path finding process for routing an IC design based on a maximum turn constraint, according to some example embodiments. FIGS. 8A-8M illustrate a grid graph 800 that represents a net of the IC design that comprises a first pin and a second pin. The grid graph 800 comprises grid cells organized into rows and columns. Grid cells are connected by edges, each of which is associated with an edge score representing available routing resources. In this example, edges between white grid cells have an associated edge score of 1, edges between grey grid cells have an associated edge score of 10, and edges between grey grid cells and white grid cells have an associated edge score of 10. In addition, in this example, the maximum turn constraint specifies a maximum of 4 turns per connection path. Accordingly, up to 5 iterations may be performed (as noted above, the number of iterations may be based on the maximum number of turns). However, less than 5 iterations may be performed in some instances. For example, if an iteration does not result in an update to any grid cell scores, the process may terminate without performing any subsequent iterations.

In the explanation that follows, grid cells are referenced by row and column number-(row number, column number). For example, grid cell (4, 5) refers to the grid cell in row 4, column 5.

Figure 8A:
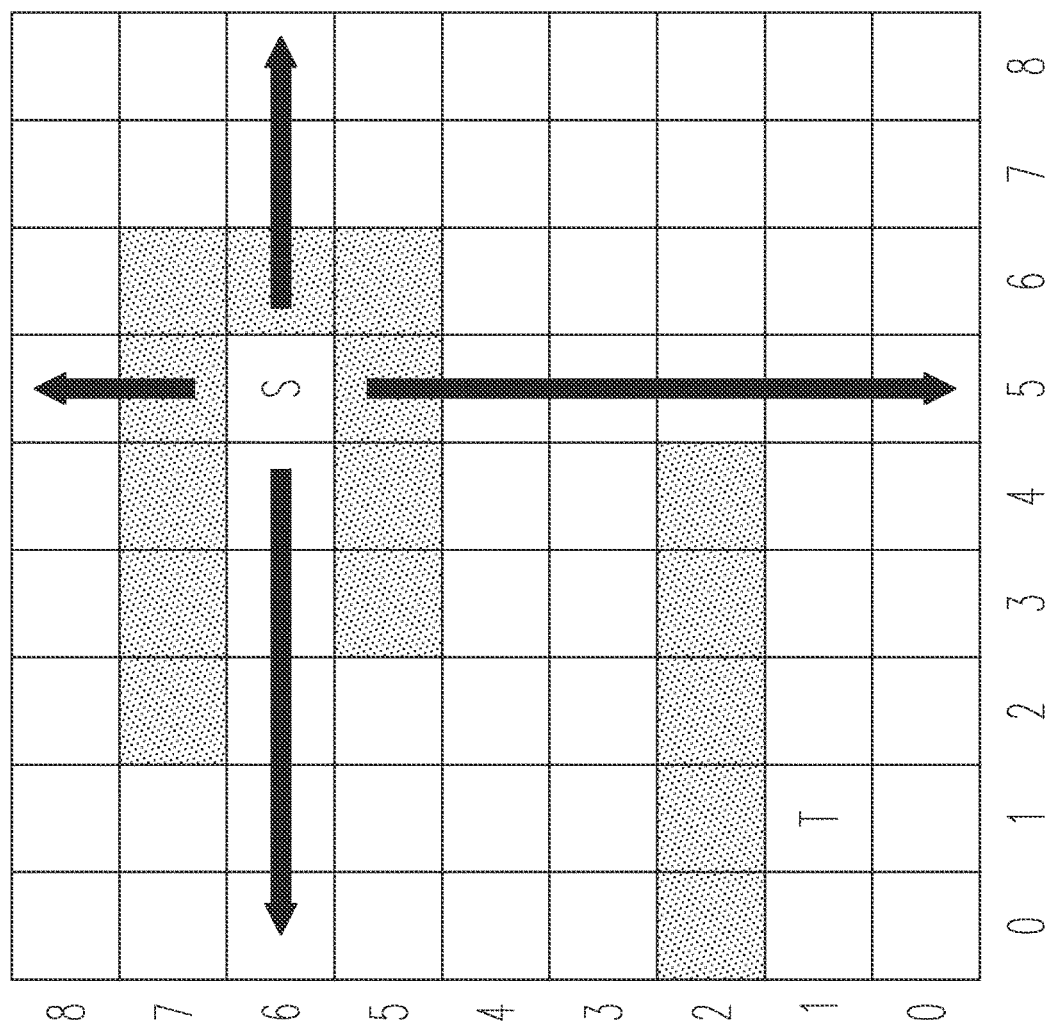

As shown in FIG. 8A, the first pin at grid cell (7, 6) is designated as the source and the second pin at grid cell (1, 1) is designated as a target. Initially, the score at the source (grid cell (7, 6)) is set to 0 while all other grid cell scores are set to positive infinity. As mentioned above and indicated in FIG. 8A, at each iteration of the multiple iteration process, horizontal score propagation is performed prior to vertical score propagation.

Figure 8B:
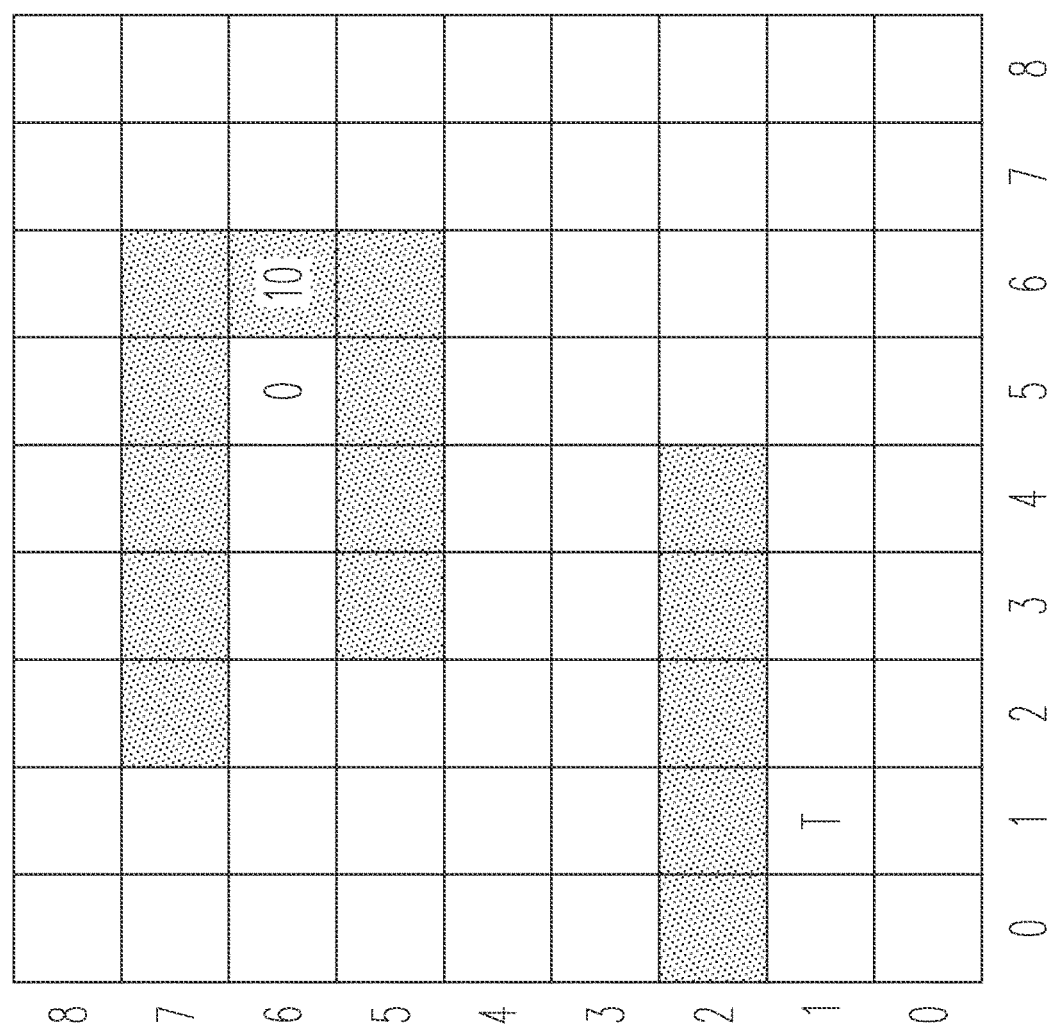

FIG. 8B illustrates an initial step in horizontal score propagation performed in a first iteration of the multiple iteration process. As shown, grid cell (6, 6) is updated with a score of 10 based on the edge score associated with the edge between the grid cell (7, 6) and grid cell (6, 6). That is, given that the sum of the current score for grid cell (7, 6) and the edge score is less than the current score of grid cell (6, 6) (0+10>∞), the score for grid cell (6, 6) is updated to the sum of current score for grid cell (7, 6) and the edge score.

Figure 8C:
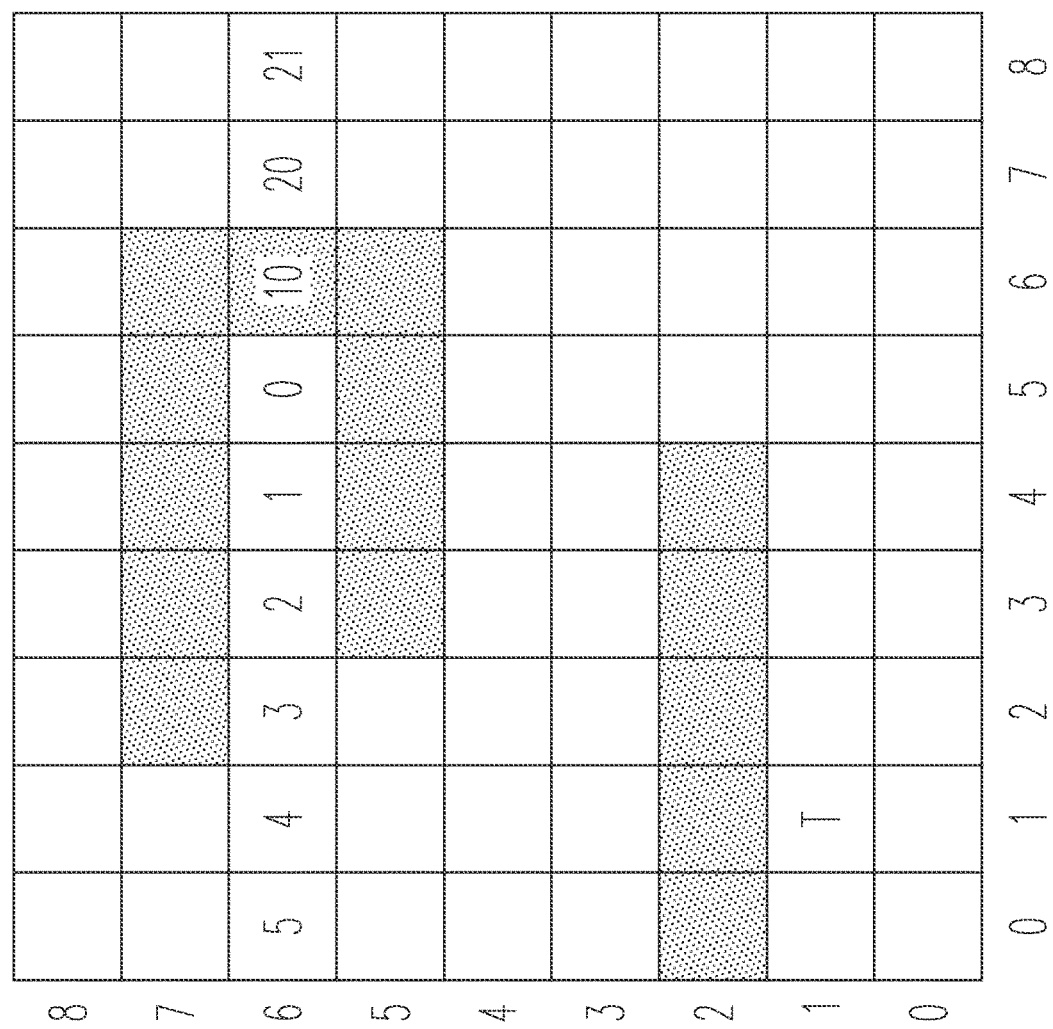
Figure 8D:
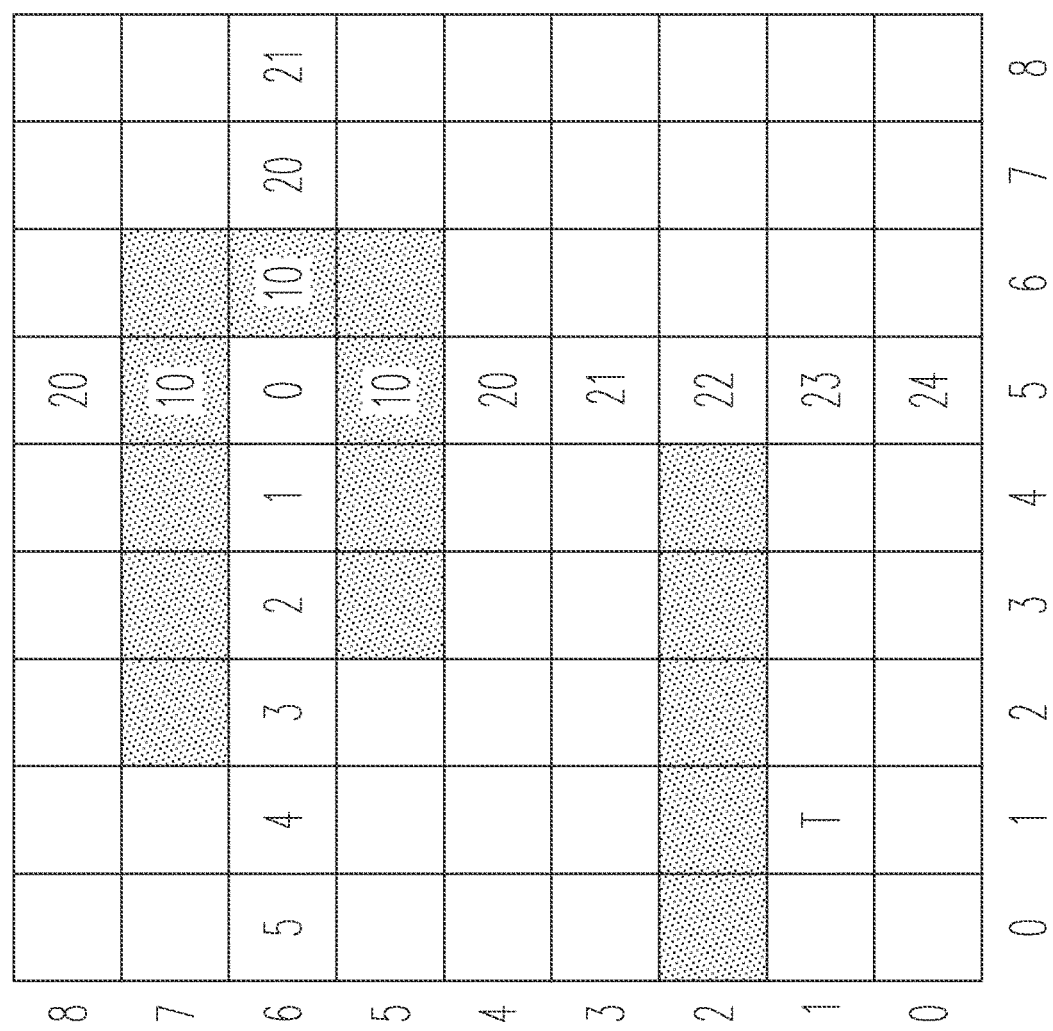

FIG. 8C illustrates the completion of horizontal score propagation for row 6 of the grid graph 800, in accordance with the methodologies described herein. Subsequent to horizontal score propagation, vertical score propagation is performed to update grid cells in column 5 of the grid graph 800, in accordance with the methodologies described herein, as shown in FIG. 8D.

Figure 8E:
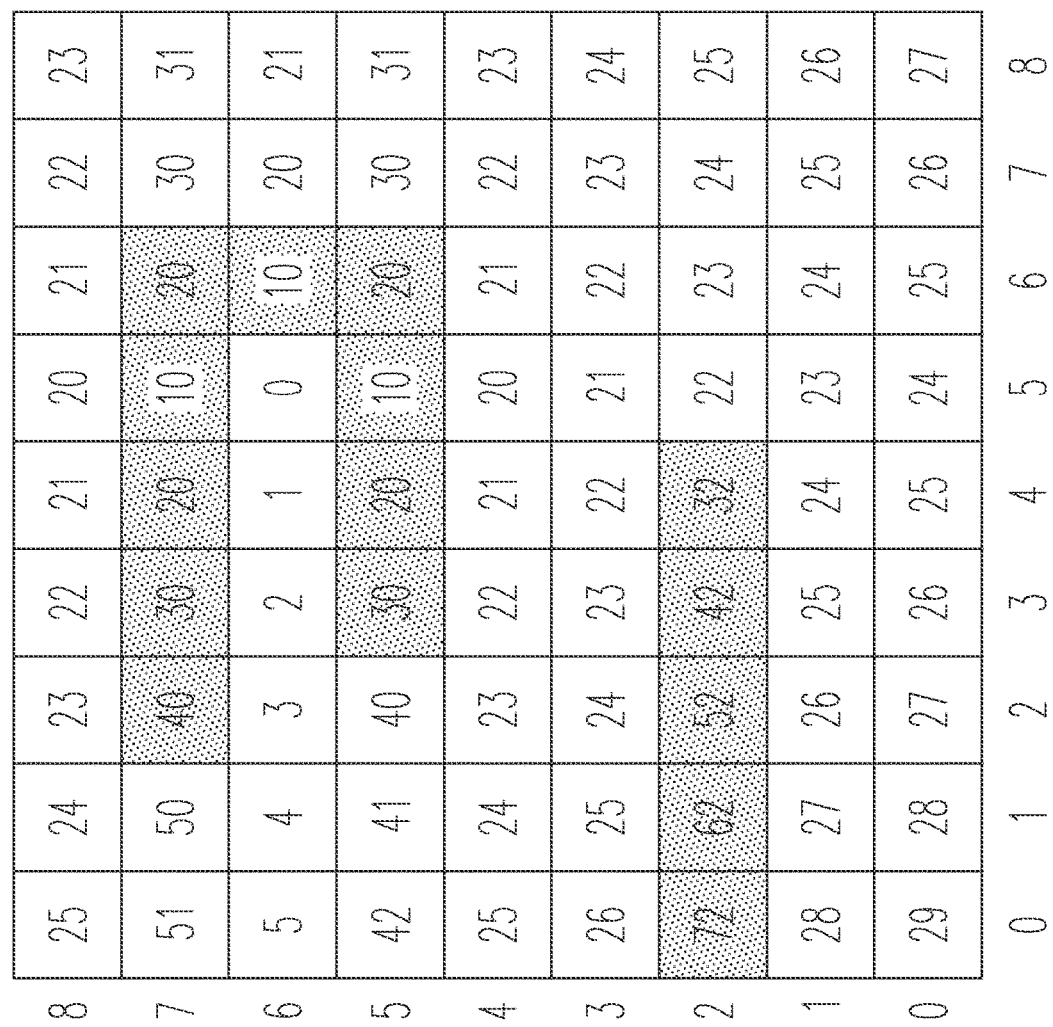

FIGS. 8E-8G illustrate a second iteration of the multiple iteration path finding process performed based on the grid graph 800. More specifically, FIG. 8E illustrates horizontal score propagation performed as part of the second iteration, FIG. 8F illustrates a first step of vertical score propagation performed as part of the second iteration, and FIG. 8G illustrates a result of completing vertical score propagation performed as part of the second iteration. As shown in FIG. 8F, the score for grid cell (5, 0) is updated to 6 based on a comparison of the sum of the current score from grid cell (6, 0) and the edge score associated with the edge between grid cell (5, 0) and grid cell (6, 0) and the current score associated with grid cell (5, 0). More specifically, given that the sum of the current score from grid cell (6, 0) and the edge score associated with the edge between grid cell (5, 0) and grid cell (6, 0) is 6 (5+1), which is less than the current score associated with grid cell (5, 0) of 42, the score for grid cell (5, 0) is updated to 6. As shown in FIG. 8G, a 1-turn path 802 with a routing score of 27 is identified based on completion of the horizontal score propagation performed as part of the second iteration.

Figure 8H:
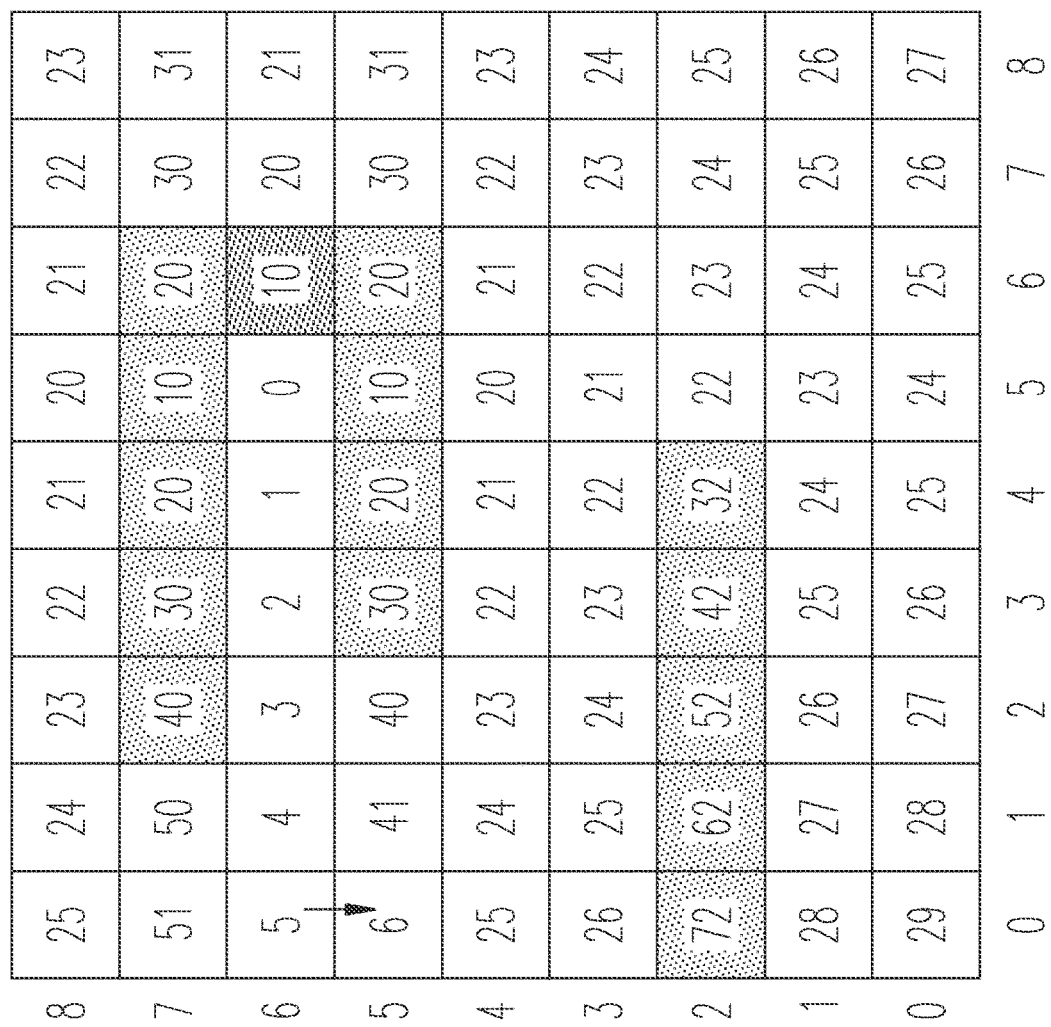

FIGS. 8H and 8I illustrate a third iteration of the multiple iteration path finding process performed based on the grid graph 800. More specifically, FIG. 8H illustrates horizontal score propagation performed as part of the third iteration, and FIG. 8I illustrates vertical score propagation performed as part of the third iteration. As shown in FIG. 8I, no scores were updated during vertical score propagation and no additional paths were identified.

FIGS. 8J and 8K illustrate a fourth iteration of the multiple iteration path finding process performed based on the grid graph 800. More specifically, FIG. 8J illustrates horizontal score propagation performed as part of the fourth iteration, and FIG. 8K illustrates vertical score propagation performed as part of the third iteration. As shown in FIG. 8K, no scores were updated during horizontal score propagation or vertical score propagation and no additional paths were identified.

Figure 8M:
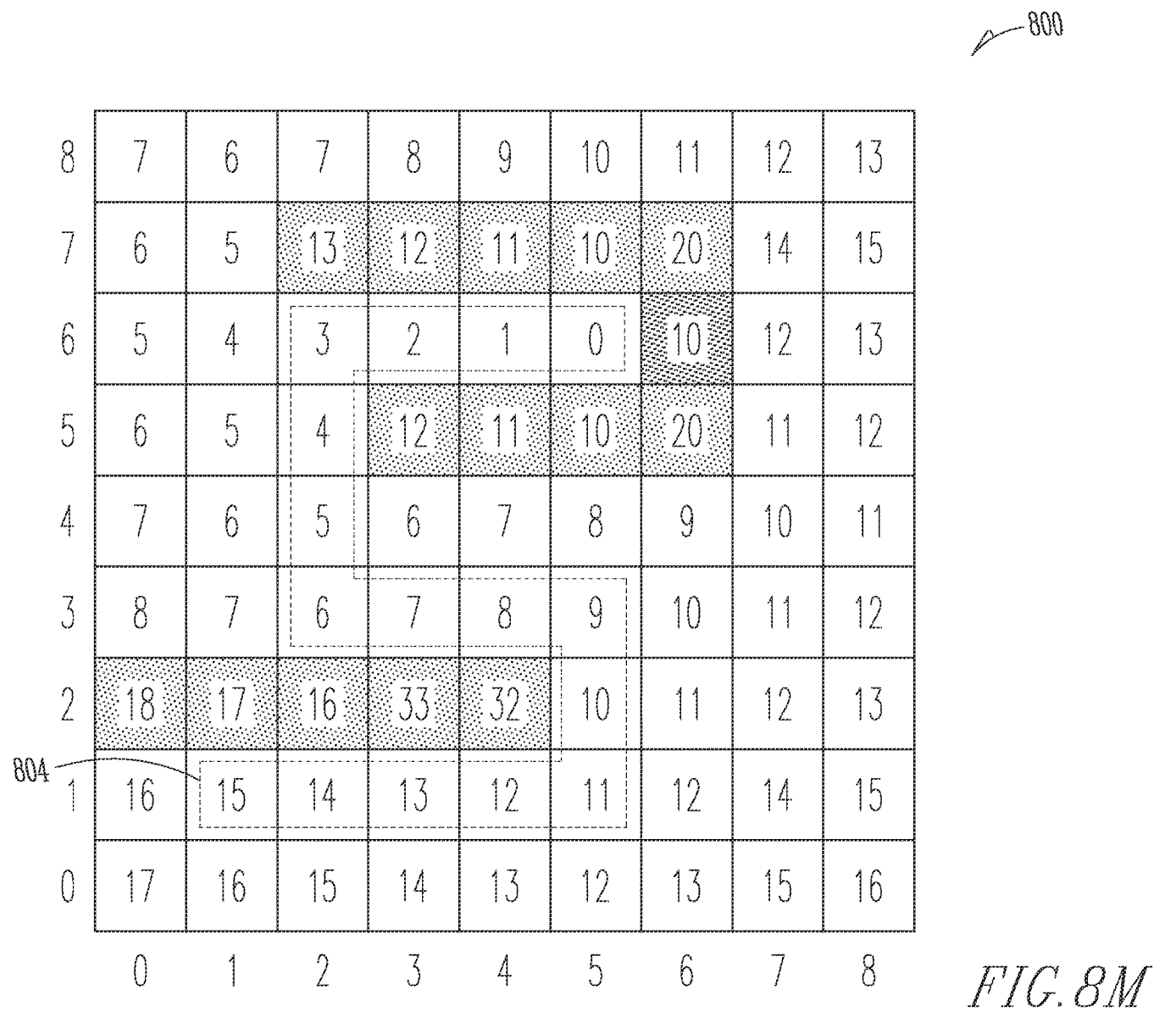

FIGS. 8L and 8M illustrate a fifth iteration of the multiple iteration path finding process performed based on the grid graph 800. More specifically, FIG. 8L illustrates horizontal score propagation performed as part of the fifth iteration, and FIG. 8M illustrates vertical score propagation performed as part of the fifth iteration. As shown in FIG. 8M, no scores were updated during horizontal score propagation. However, a 4-turn path 804 with a routing score of 15 is identified based on performance of the fifth iteration. Given the score of the 4-turn path 804 is less than the 1-turn path 802 identified during the second iteration and given the maximum turn constraint specifies a 4 turn maximum, the multiple iteration path finding process ends after the fifth iteration, and the path with the lowest score is selected as the connection path between the first pin and the second pin, which in this example is the 4-turn path 804 identified at the fifth iteration.

Figure 9:
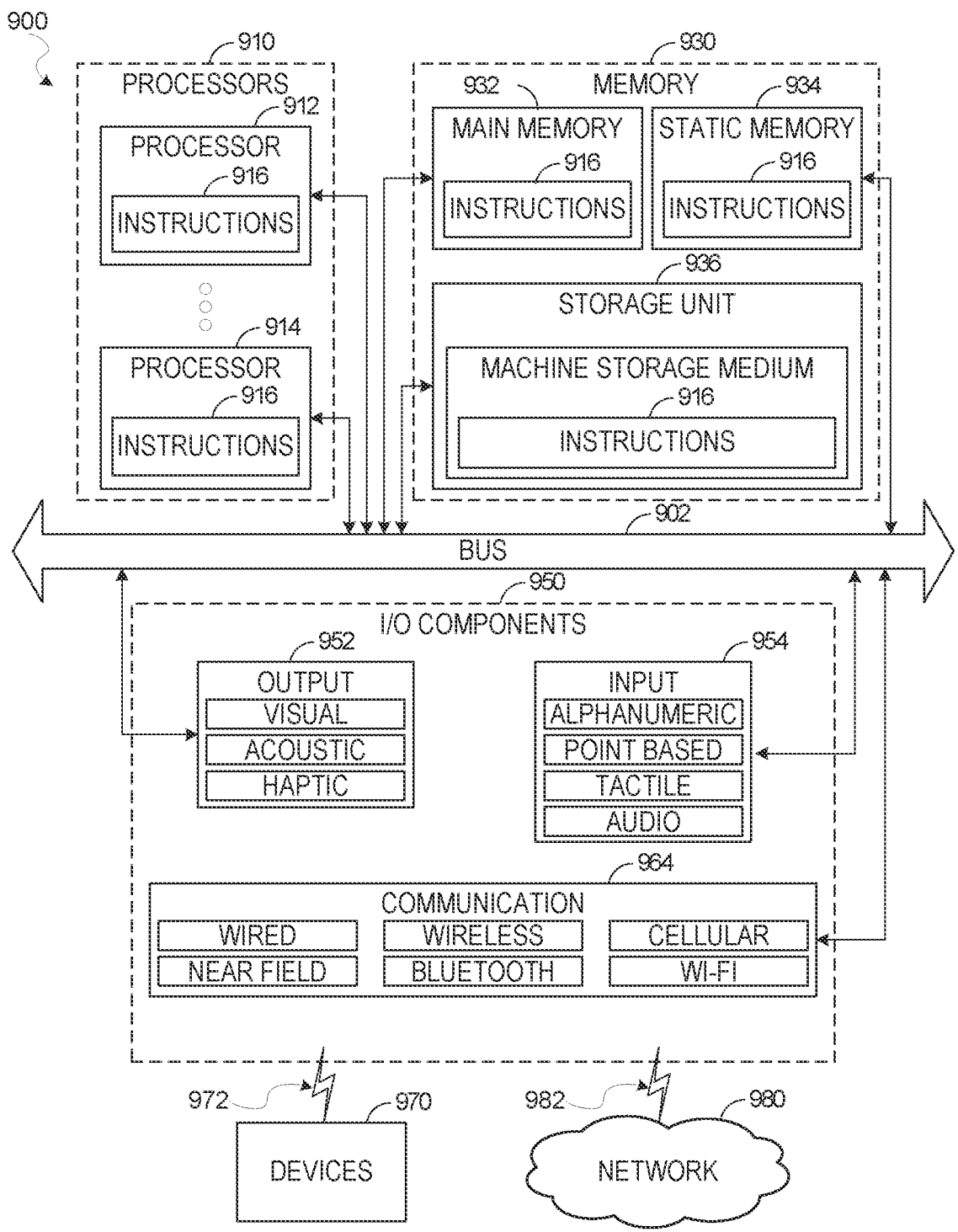
FIG. 9 is a diagrammatic representation of a machine in the example form of a computer system within which a set of instructions for causing the machine to perform any one or more of the methodologies discussed herein may be stored and executed.

FIG. 9 illustrates a diagrammatic representation of a machine 900 in the form of a computer system within which a set of instructions may be executed for causing the machine 900 to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute an EDA software system that executes the method 200. Additionally, or alternatively, the instructions 916 may implement FIGS. 1 and 4. The instructions 916 transform the general, non-programmed machine 900 into a particular machine 900 programmed to carry out the described and illustrated functions in the manner described here. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors 910 that may comprise two or more independent processors (sometimes referred to as "cores") that may execute instructions contemporaneously. Although FIG. 9 shows multiple processors, the machine 900 may include a single processor with a single core, a single processor with multiple cores (e.g., a multi-core processor), multiple processors with a single core, multiple processors with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, and other communication components (NFC, Bluetooth, and Wi-Fi) to provide communication via other modalities. The devices 970 may be another machine or any of a wide variety of peripheral devices (e.g., a peripheral device coupled via a universal serial bus (USB)).

Executable Instructions and Machine-Storage Medium

The various memories (e.g., 930, 932, 934, and/or memory of the processor(s) 910) and/or the storage unit 936 may store one or more sets of instructions and data structures (e.g., software) embodying or utilized by any one or more of the methodologies or functions described herein. These instructions, when executed by the processor(s) 910, cause various operations to implement the disclosed embodiments.

The terms "machine-storage medium," "device-storage medium," and "computer storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
one or more processors of a machine; and
a computer storage medium storing instructions, which when executed by the machine, cause the machine to perform operations comprising:
accessing, from memory, data describing an integrated circuit design, the integrated circuit design comprising a net specifying a connection between a first pin and a second pin;
accessing a maximum turn constraint for the integrated circuit design, the maximum turn constraint specifying a maximum number of turns for connection paths generated in routing the integrated circuit design;
routing the net based on the maximum turn constraint, the routing of the net resulting in a routed net comprising a connection path between the first pin and the second pin, the connection path comprising a number of turns that satisfy the maximum turn constraint, the routing of the net comprising:
identifying, based on a grid graph representing the net, one or more paths between the first pin and the second pin that satisfy the maximum turn constraint, the grid graph comprising a plurality of grid cells and a plurality of edges, the plurality of grid cells being organized into rows and columns, each edge of the plurality of edges connecting two grid cells and being associated with an edge score representing an availability of routing resources, the identifying of the one or more paths comprising performing score propagation in a vertical direction, the performing of score propagation in the vertical direction comprising:
determining a first edge score associated with a first edge between a first grid cell and a second grid cell that is adjacent to the first grid cell in a column of the grid graph;
determining a first cell score associated with the first edge; and
setting a second cell score associated with the second grid cell based on a sum of the first edge score and the first cell score;
and
selecting, from the one or more paths, the connection path between the first pin and the second pin based on a routing score determined for each of the one or more routes; and
generating a layout instance for the integrated circuit design based in part on the routed net, the layout instance describing physical layout dimensions of the integrated circuit design.

2. The system of claim 1, wherein routing the net comprises:
determining the routing score for each of the one or more routes.

3. The system of claim 2, wherein:
identifying the one or more routes between the first pin and the second pin comprises:
generating the grid graph representing the net;
defining the first pin as a source;
defining the second pin as a target; and
the identifying of the one or more paths comprises determining, using a path finding algorithm, one or more paths between the source and the target that satisfy the maximum turn constraint, wherein the one or more paths between the first pin and the second pin correspond to the one or more paths between the source and the target.

4. The system of claim 3, wherein determining the one or more paths comprises:
performing multiple iterations of path finding between the source and the target to identify the one or more paths, wherein a number of iterations performed corresponds to the maximum number of turns.

5. The system of claim 4, wherein each iteration of path finding comprises:
performing score propagation in a horizontal direction, wherein the performing of the score propagation in the horizontal direction comprises updating one or more scores associated with one or more grid cells in one or more rows of the grid graph,
wherein the performing of the score propagation in the vertical direction comprises updating one or more scores associated with one or more grid cells in one or more columns of the grid graph.

6. The system of claim 5, wherein:
performing score propagation in the horizontal direction comprises:
determining a first edge score associated with a first edge between a first grid cell and a second grid cell that is adjacent to the first grid cell in a row of the grid graph;
determining a first cell score associated with the first cell; and
setting a second cell score associated with the second grid cell based on a sum of the first edge score and the first cell score.

7. The system of claim 6, wherein the performing of score propagation in the horizontal direction further comprises:
determining the sum of the first edge score and the first cell score is less than a current score associated with the second grid cell, wherein the setting of the second cell score is based on determining the sum of the first edge score and the first cell score is less than a current score associated with the second grid cell.

8. The system of claim 5, wherein the performing of score propagation in the vertical direction further comprises:
determining whether the second cell score was updated during score propagation in the horizontal direction, the setting of the second cell score is based on determining the second score was not updated during score propagation in the horizontal direction.

9. The system of claim 1, wherein the accessing of the maximum turn constraint comprises receiving, from a user, the maximum turn constraint.

10. The system of claim 1, wherein the number of turns in the connection path between the first pin and the second pin do not exceed the maximum number of turns.

11. A method comprising:
accessing, from memory, data describing an integrated circuit design, the design comprising a net specifying a connection between a first pin and a second pin;
receiving, from a user, a maximum turn constraint for the integrated circuit design, the maximum turn constraint specifying a maximum number of turns for connection paths generated in routing the integrated circuit design;

routing the net based on the maximum turn constraint, the routing of the net resulting in a routed net comprising a connection path between the first pin and the second pin, the connection path comprising a number of turns that satisfy the maximum turn constraint, the routing of the net comprising:

identifying, based on a grid graph representing the net, one or more paths between the first pin and the second pin that satisfy the maximum turn constraint, the grid graph comprising a plurality of grid cells and a plurality of edges, the plurality of grid cells being organized into rows and columns, each edge of the plurality of edges connecting two grid cells and being associated with an edge score representing an availability of routing resources, the identifying of the one or more paths comprising performing score propagation in a vertical direction, the performing of score propagation in the vertical direction comprising:

determining a first edge score associated with a first edge between a first grid cell and a second grid cell that is adjacent to the first grid cell in a column of the grid graph;

determining a first cell score associated with the first edge; and setting a second cell score associated with the second grid cell based on a sum of the first edge score and the first cell score;

and selecting, from the one or more paths, the connection path between the first pin and the second pin based on a routing score determined for each of the one or more routes; and generating a layout instance for the integrated circuit design based in part on the routed net, the layout instance describing physical layout dimensions of the integrated circuit design.

12. The method of claim 11, wherein routing the net comprises:

determining the routing score for each of the one or more routes.

13. The method of claim 12, wherein identifying the one or more routes between the first pin and the second pin comprises:

generating a grid graph representing the net;
defining the first pin as a source;
defining the second pin as a target; and
the identifying of the one or more paths comprises determining, using a path finding algorithm, one or more paths between the source and the target that satisfy the maximum turn constraint, wherein the one or more paths between the first pin and the second pin correspond to the one or more paths between the source and the target.

14. The method of claim 13, wherein determining the one or more paths comprises:

performing multiple iterations of path finding between the source and the target to identify the one or more paths, wherein a number of iterations performed corresponds to the maximum number of turns.

15. The method of claim 14, wherein each iteration of path finding comprises:

performing score propagation in a horizontal direction, wherein the performing of the score propagation in the horizontal direction comprises updating one or more scores associated with one or more grid cells in one or more rows of the grid graph, wherein the performing of the score propagation in the vertical direction comprises updating one or more scores associated with one or more grid cells in one or more columns of the grid graph.

16. The method of claim 15, wherein:

performing score propagation in the horizontal direction comprises:

determining a first edge score associated with a first edge between a first grid cell and a second grid cell that is adjacent to the first grid cell in a row of the grid graph;

determining a first cell score associated with the first cell; and setting a second cell score associated with the second grid cell based on a sum of the first edge score and the first cell score.

17. A computer storage medium storing instructions, which when executed by a machine, cause the machine to perform operations comprising:

accessing, from memory, data describing an integrated circuit design, the integrated circuit design comprising a net specifying a connection between a first pin and a second pin;

receiving, from a user, a maximum turn constraint for the integrated circuit design, the maximum turn constraint specifying a maximum number of turns for connection paths generated in routing the integrated circuit design;

routing the net based on the maximum turn constraint, the routing of the net resulting in a routed net comprising a connection path between the first pin and the second pin, the connection path comprising a number of turns that satisfy the maximum turn constraint, the routing of the net comprising:

identifying, based on a grid graph representing the net, one or more paths between the first pin and the second pin that satisfy the maximum turn constraint, the grid graph comprising a plurality of grid cells and a plurality of edges, the plurality of grid cells being organized into rows and columns, each edge of the plurality of edges connecting two grid cells and being associated with an edge score representing an availability of routing resources, the identifying of the one or more paths comprising performing score propagation in a vertical direction, the performing of score propagation in the vertical direction comprising:

determining a first edge score associated with a first edge between a first grid cell and a second grid cell that is adjacent to the first grid cell in a column of the grid graph;

determining a first cell score associated with the first edge; and setting a second cell score associated with the second grid cell based on a sum of the first edge score and the first cell score;

and selecting, from the one or more paths, the connection path between the first pin and the second pin based on a routing score determined for each of the one or more routes; and updating the data describing the integrated circuit design based in part on the routed net.

18. The computer storage medium of claim 17, wherein routing the net comprises:

determining the routing score for each of the one or more routes.

19. The computer storage medium of claim 17, wherein determining the one or more paths comprises:

performing multiple iterations of path finding between the first pin and the second pin to identify the one or more paths, wherein a number of iterations performed corresponds to the maximum number of turns.

20. The computer storage medium of claim 19, wherein each iteration of path finding comprises:
performing score propagation in a horizontal direction, wherein the performing of the score propagation in the horizontal direction comprises updating one or more scores associated with one or more grid cells in one or more rows of the grid graph, wherein the performing of the score propagation in the vertical direction comprises updating one or more scores associated with one or more grid cells in one or more columns of the grid graph.

* * * * *